No. 707,937. Patented Aug. 26, 1902.
H. NUTRIZIO.
COFFEE POT.
(Application filed Jan. 20, 1902.)

(No Model.)

Witnesses
M. A. Bloudel
Clarence Shaw

Inventor
Henry Nutrizio.
By Omar A. Brock
Attorneys

THE NORRIS PETERS CO., PHOTO-LITHO., WASHINGTON, D. C.

UNITED STATES PATENT OFFICE.

HENRY NUTRIZIO, OF HENDERSON, NORTH CAROLINA.

COFFEE-POT.

SPECIFICATION forming part of Letters Patent No. 707,937, dated August 26, 1902.

Application filed January 20, 1902. Serial No. 90,508. (No model.)

*To all whom it may concern:*

Be it known that I, HENRY NUTRIZIO, a citizen of the United States, residing at Henderson, in the county of Vance and State of North Carolina, have invented a new and useful Coffee-Pot, of which the following is a specification.

This invention relates generally to coffee and tea pots, and more particularly to that class of coffee-pots in which the finely-ground coffee is held within a suitable receptacle and the boiling water caused to pass therethrough.

The object of the present invention is to provide a coffee-pot of this kind which shall be exceedingly cheap and simple in construction and one in which the parts are so arranged that they can be quickly and easily cleaned; and another object is to construct the invention of as few parts as possible, so that the danger of some of the parts becoming damaged or lost is reduced to a minimum.

With these objects in view the invention consists in arranging a cylinder rigidly within the coffee-pot and resting firmly upon the bottom thereof, the lower portion of said cylinder being perforated, and in forming the said cylinder with a suitable stop upon which a perforated follower rests for the purpose of holding the ground coffee at the lower ends of the cylinder.

The invention consists also in certain details of construction and novelties of combination, all of which will be fully described hereinafter and pointed out in the claim.

Figure 1:
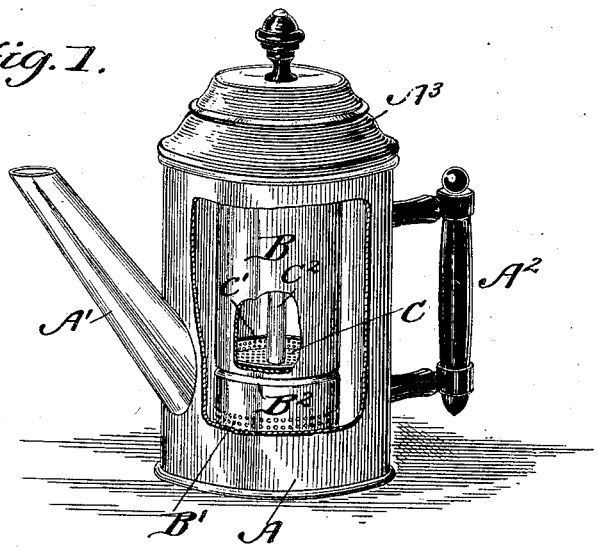
Figure 2:
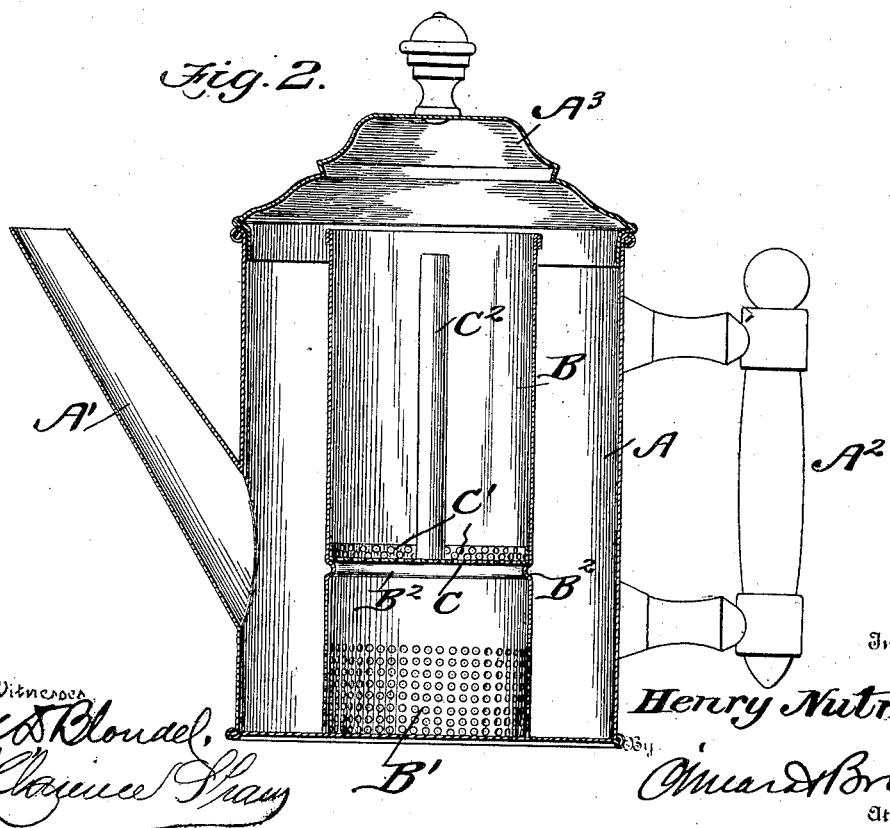

In the drawings forming part of this specification, Figure 1 is a perspective view showing a coffee-pot constructed in accordance with my invention, certain parts being broken away to illustrate the interior construction. Fig. 2 is a vertical longitudinal sectional view.

In carrying out my invention I employ a coffee-pot A, having the usual spout A', handle $A^2$, and top or cover $A^3$. All of these parts are constructed and arranged in substantially the usual and well-known manner. Arranged within the coffee-pot and resting upon the bottom thereof is an open-ended cylinder B, said cylinder being secured at its lower end to the bottom of the coffee-pot by solder or in any other suitable manner. The lower portion of this cylinder is perforated, as shown at B', and a short distance above such perforated portion the cylinder is formed with an inwardly-projecting annular bead $B^2$, upon which is adapted to rest perforated follower C, the edges of which are turned upwardly, as shown at C'. This follower is intended to hold the ground coffee within the lower portion of the cylinder B and is perforated to permit the boiling water to pass therethrough. This follower C is provided with a handle $C^2$, by means of which it may be removed and inserted, said handle being of such length that when the follower is in place within the cylinder and resting upon the bead the handle will be substantially even with the top of the cylinder, and therefore will not interfere in the least with the cover or top of the coffee-pot.

In operation the coffee is placed within a cylinder B and rests upon the bottom of the coffee-pot. The follower C is then fixed in the cylinder and the boiling water poured into said cylinder. The boiling water passes through the ground coffee and out through the perforated sides of the cylinder and collects within the pot in the annular space surrounding the cylinder, and by holding the coffee at the bottom of the pot all of the strength will be extracted therefrom, and all danger of the coffee-grounds escaping from the pot is avoided.

By means of a coffee-pot constructed in accordance with my invention I am enabled to produce coffee of maximum strength and clearness.

Having thus fully described my invention, what I claim as new, and desire to secure by Letters Patent of the United States, is—

The combination with a coffee-pot, of a cylinder arranged therein resting upon the bottom and rigidly secured to said bottom, the lower portion of said cylinder being perforated, said cylinder having an inwardly-projecting annular bead at a point above the perforations, and a perforated follower adapted to rest upon said bead, said follower having a handle, the upper end of which is adapted to rest substantially even with the top of the cylinder, substantially as specified.

HENRY NUTRIZIO.

Witnesses:
CHAS. E. BROCK,
CLARENCE SHAW.